INVENTORS
ALVIN W. OEHLER
NOLAN D. COLVIN
LOUIS A. PARADISE

ATTORNEYS

July 26, 1949.　　　A. W. OEHLER ET AL　　　2,477,389
HARVESTER
Filed April 24, 1944　　　　　　　　　　　　6 Sheets-Sheet 2

INVENTORS
ALVIN W. OEHLER
NOLAN D. COLVIN
LOUIS A. PARADISE
BY
ATTORNEYS

July 26, 1949.  A. W. OEHLER ET AL  2,477,389
HARVESTER
Filed April 24, 1944  6 Sheets-Sheet 3
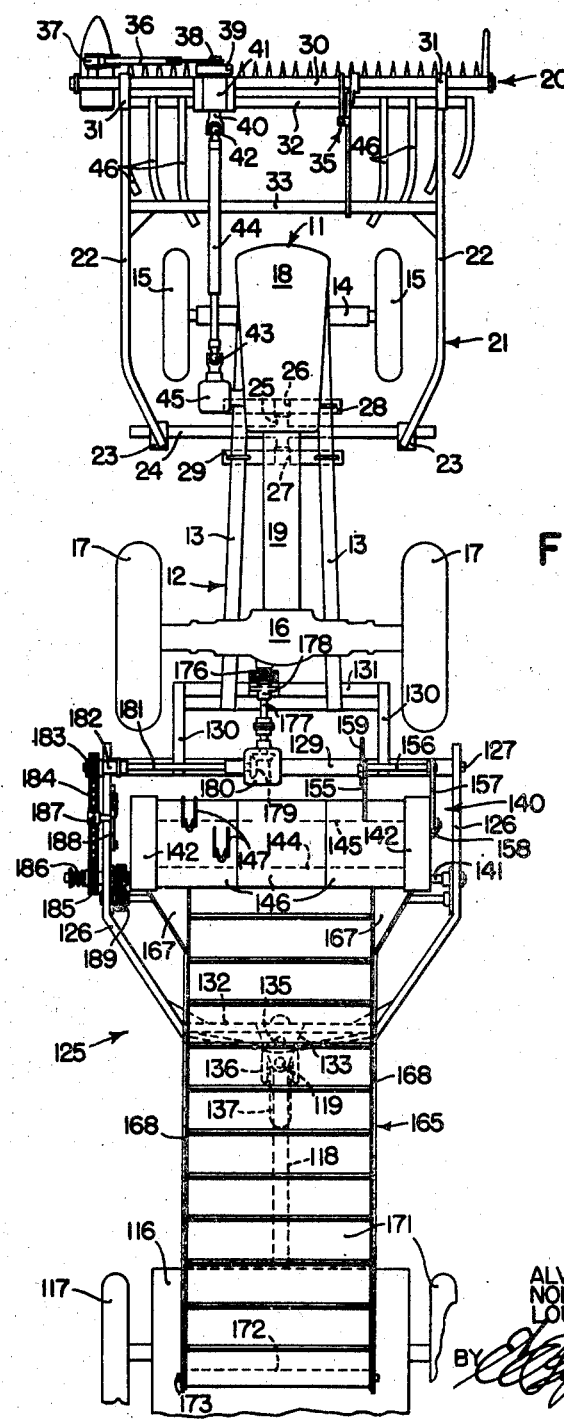
FIG. 3
*INVENTORS*
ALVIN W. OEHLER
NOLAN D. COLVIN
LOUIS A. PARADISE
ATTORNEYS July 26, 1949.  A. W. OEHLER ET AL  2,477,389
HARVESTER Filed April 24, 1944  6 Sheets-Sheet 5

INVENTORS
ALVIN W. OEHLER
NOLAN D. COLVIN
LOUIS A. PARADISE
BY
ATTORNEYS

July 26, 1949.　　　A. W. OEHLER ET AL　　　2,477,389
HARVESTER
Filed April 24, 1944　　　　　　　　　　6 Sheets-Sheet 6
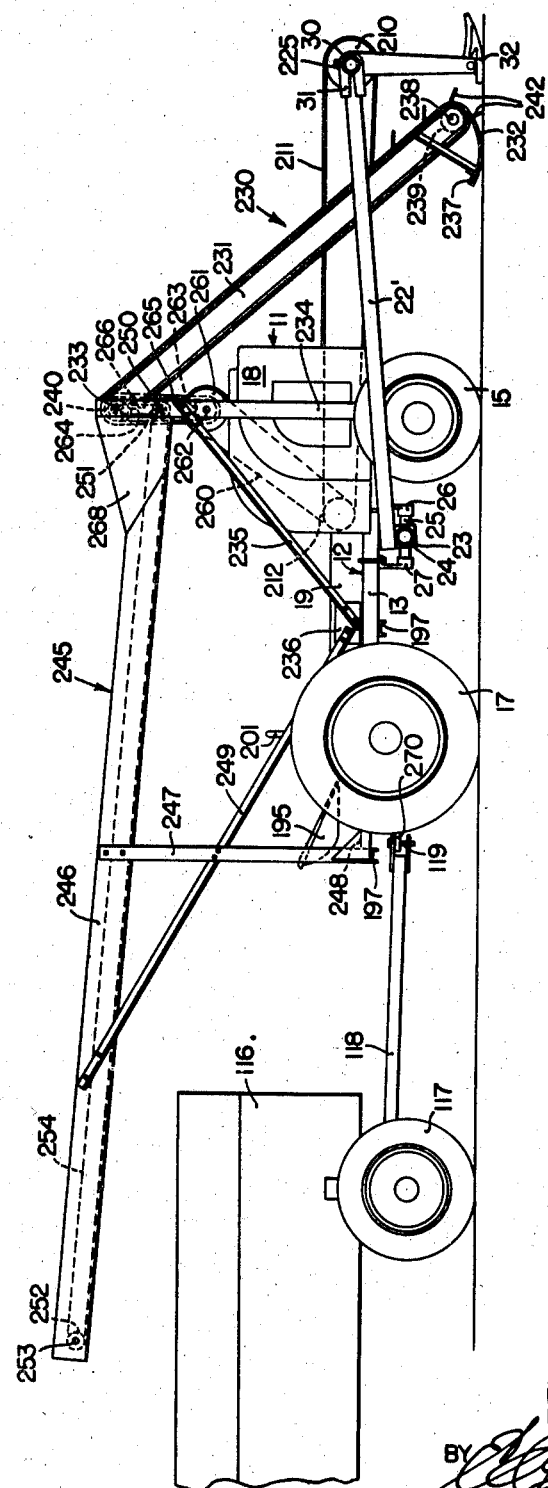
FIG. 6
INVENTOR.
ALVIN W. OEHLER
NOLAN D. COLVIN
LOUIS A. PARADISE
BY 
ATTORNEYS Patented July 26, 1949

2,477,389

UNITED STATES PATENT OFFICE 2,477,389

HARVESTER

Alvin W. Oehler, Nolan D. Colvin, and Louis A. Paradise, Moline, Ill., assignors to Deere & Company, Moline, Ill., a corporation of Illinois Application April 24, 1944, Serial No. 532,496

8 Claims. (Cl. 56—23)

The present invention relates generally to harvesters and more particularly to the type of harvester that cuts the standing crop and loads it into a vehicle such as a wagon or truck for transportation from the field, and is particularly applicable to crops such as green hay, alfalfa, peas, and the like, which are desired to be processed or stored promptly after they are cut.

The principal object of this invention has to do with the provision of a self-propelled harvester which cuts the crop and immediately loads it into a transporting vehicle, and which is simple and inexpensive and is also easily maneuverable and fast in operation.

A further object of the present invention has to do with the provision of a harvester which cuts a single swath directly in its own path and immediately loads it into a wagon or trailer which runs in the same path and thus prevents damage to the standing crop. A common type of harvester is in the form of an implement which is towed by a tractor in offset relation thereto and loads the crop into a trailing vehicle which is offset in the opposite direction and thus both the tractor and the vehicle must run over the standing crop when the field is being opened.

Still another object of the present invention relates to the provision of a harvester which cuts the crop in a swath which extends into the fence corners. The trailing type of implement necessarily makes a curved path at the corner of the field and therefore misses the crop which stands in a small triangular path in each of the corners of the field.

These and other objects and advantages of our invention will be apparent to those skilled in the art after a consideration of the following description, in which reference is had to the drawings appended hereto, in which Figure 1 is a plan view of a self-propelled or tractor-mounted harvester embodying the principles of the present invention.

Figure 3 is a plan view showing a modified form of the invention.

Figure 6 is a side elevational view of the embodiment shown in Figure 5.

Figure 1:
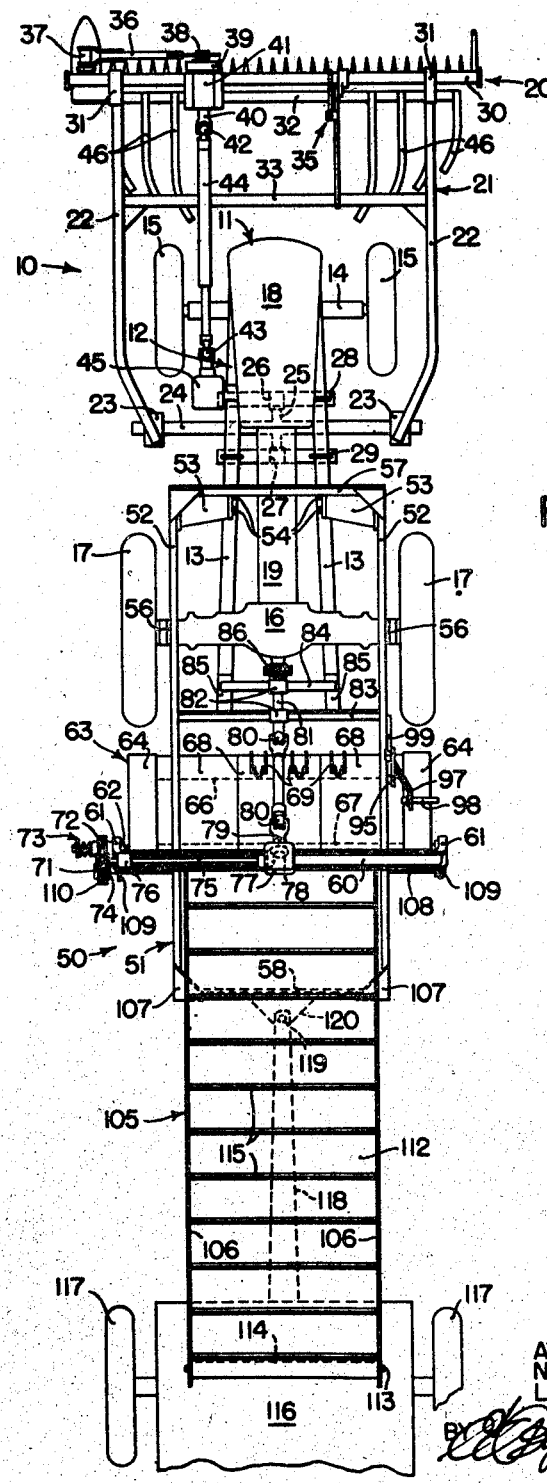
Figure 2:
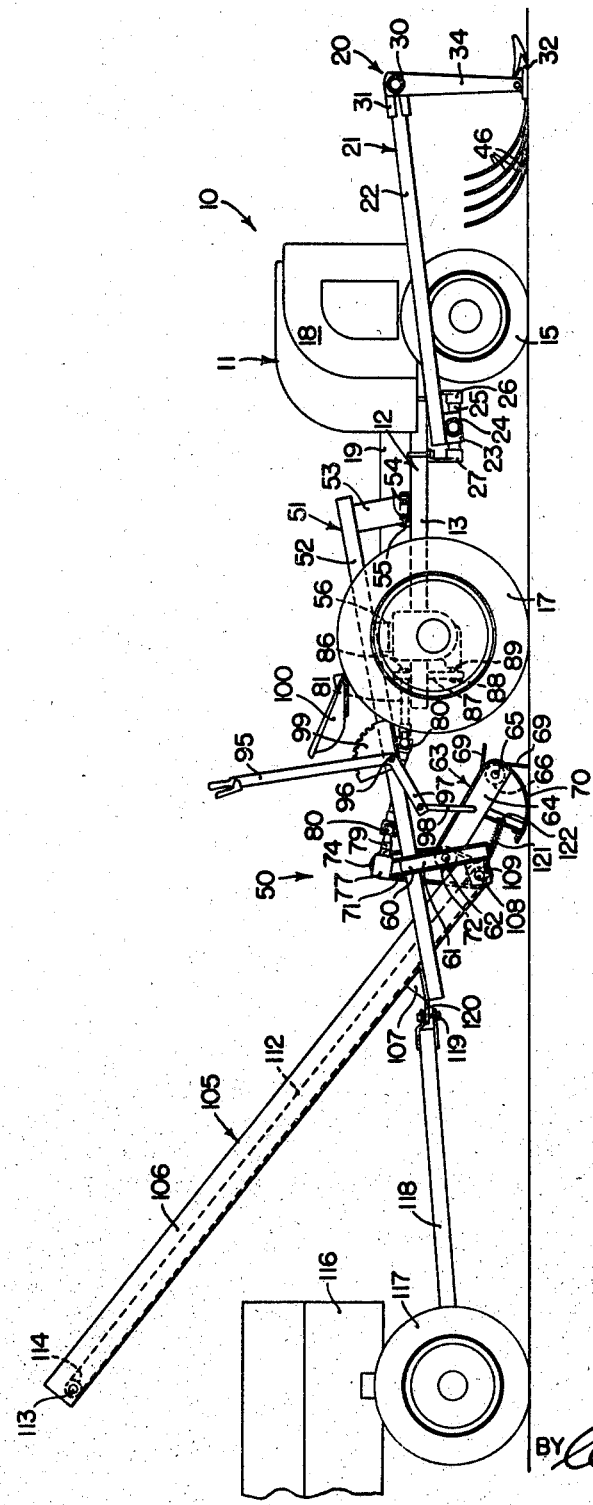
Figure 2 is a side elevational view of the embodiment shown in Figure 1.

Referring now to the drawings and more particularly to Figures 1 and 2, the harvester is indicated in its entirety by reference numeral 10 and comprises a wheel supported power driven device in the form of a conventional tractor 11, which comprises a longitudinally extending frame 12 including a pair of longitudinally extending laterally spaced frame beams 13 mounted at their forward ends on a transverse axle 14, carried at opposite ends, respectively, on a pair of dirigible front wheels 15. The rear ends of the beams 13 are rigidly connected to a transverse rear axle housing 16 extending laterally in opposite directions from the frame 12 and mounted on a pair of laterally spaced traction wheels 17. A power plant is carried in a suitable housing 18 on the forward end of the frame 12 and is connected to a drive mechanism within the axle housing 16 by a suitable power transmitting shaft (not shown) extending longitudinally through an enclosure 19. A tractor of this type is shown and described in detail in application, Serial No. 172,906, filed November 5, 1937, by Maxon, Sklovsky and Nordenson, and issued March 28, 1944, as Patent No. 2,345,351.

At the forward end of the tractor 11 is mounted a mower indicated in its entirety by reference numeral 20, comprising a supporting frame 21 including a pair of laterally spaced longitudinally extending frame beams 22, disposed along opposite sides of the tractor, respectively, and swingably attached at their rear ends by depending brackets 23 to a transverse pipe member 24 disposed beneath the tractor body between the front and rear wheels 15, 17 thereof. The pipe member 24 is rigidly fixed to a fore and aft extending shaft 25 journaled in a pair of longitudinally spaced front and rear bearing brackets 26, 27, respectively, the latter being rigidly mounted on cross frame members 28, 29 on the tractor frame 12. Thus, the frame 21 is swingable vertically about the transverse axis of the pipe member 24, on which the brackets 23 are journaled, and the frame 21 is also tiltable about the fore and aft extending axis of the shaft 25, thus providing for free floating movement of the mower frame relative to the tractor. A tubular rockshaft 30 is journaled in bearings 31 at the forward end of the two frame beams 22. Directly beneath the rockshaft 30 is disposed a more or less conventional mower cutter bar 32 which extends transversely across the front of the tractor and in the path of forward movement thereof. A transverse bracing member 33 is rigidly connected between the two frame bars 22. The cutter bar 32 is mounted at the lower ends of a pair of laterally spaced generally vertical legs 34, which are secured at their upper ends to the rockshaft 30, whereby the cutter bar 32 is swingable rearwardly and upwardly about the transverse axis of the rockshaft 30. A spring latch mechanism indicated by reference numeral 35 (Figures 1 and 3), normally braces the rockshaft against swinging movement and reacts against the transverse brace 33 to hold the cutter bar 32 in ground engaging position, but yields when the mower encounters an obstruction in the field. Further details of this mechanism are not considered necessary here, for reference may be had to Patent No. 2,340,488, granted to Paradise and Coultas, February 1, 1944, for a complete description of a mower of this type including these and other details of construction and operation of the mower.

The mower sickle is driven through a pitman 36 (see Figures 1 and 3) connected through a swingable bearing 37 to the sickle and having a crank bearing 38 at its opposite end, which is journaled on a suitable crank mounted on a flywheel 39, which is fixed to a supporting shaft 40 and carried in a journal bearing 41, which is rigidly mounted on the rockshaft 30. The shaft 40 is connected through a pair of universal joints 42, 43 and a telescoping shaft 44, to a pair of intermeshing bevel gears disposed within a housing 45 fixed to the side of the engine and having a suitable power connection with the crankshaft of the engine.

A plurality of rearwardly extending rods 46 are attached at their forward ends to the transverse cutter bar 32 and extend rearwardly therefrom, the rear ends of the rods 46 being curved upwardly and inwardly toward the center line of the tractor. The rods 46 are segregated in two groups, one group ahead of each of the front wheels 15 of the tractor. As the implement advances in the field, the crop cut by the ends of the mower is guided by the curved rear ends of the rods 46 and laid in a windrow between the front wheels of the tractor, whereby the crop is not damaged by the tractor wheels.

At the rear end of the tractor is mounted a pick-up and conveying device indicated generally by reference numeral 50. The pick-up and conveying device is in the form of a crop loader comprising a rigid frame 51 including a pair of laterally spaced, longitudinally extending frame bars 52 mounted at their forward ends on a pair of downwardly and inwardly extending bracket plates 53 secured by bolts 54 to lugs 55 which are rigidly fixed as by welding to the top surfaces of the tractor frame members 13. The frame bars 52 extend rearwardly over the tractor axle housing 16, are inclined slightly downwardly and rearwardly and are mounted on brackets 56 which are bolted to the top of the rear axle housing 16 adjacent the traction wheels 17. The forward ends of the bars 52 are interconnected by a transverse frame member 57 and the rear ends of the frame bars 52 are interconnected by a transverse frame member 58. Thus, the rectangular frame 51 is rigidly mounted on the tractor frame and overhangs the tractor as a cantilever frame. An inverted U-shaped channel member 60 extends transversely across the tops of the frame bars 52 and project outwardly beyond the latter at opposite sides thereof. The outer ends of the channel member 60 turn downwardly to provide a pair of supporting legs 61. A transverse shaft 62 is journaled at opposite ends thereof, respectively, in the legs 61, and extends beneath the frame bars 52. A pick-up device 63 is swingably mounted on the shaft 62 and comprises a pair of downwardly and forwardly extending legs 64 interconnected at their lower ends by a shaft 65, which is journaled in the legs 64 and carries a roller 66. A second roller 67 is fixed to the shaft 62 and rotates therewith. A plurality of flexible endless pick-up belts 68 are trained over the two rollers 66, 67 and are provided with rows of spring teeth or fingers 69 attached to the belts 68. The lower ends of the legs 64 are provided with ground engaging shoes or runners 70, which gauge the forward roller 66 so that the ends of the fingers 69 brush over the ground as the upper flights of the belts 68 move upwardly and rearwardly around the lower roller 66. The belts are driven by the upper roller 67, which receives power through a power transmitting chain 71 trained over a sprocket 72 on the shaft 62 and connected to the latter through a suitable conventional slip clutch indicated by reference numeral 73. The chain 71 is also trained over a sprocket 74 fixed to a power shaft 75 which is journaled in a bearing 76 mounted near the outer end of the U-shaped channel member 60 and extending inwardly toward the center line of the implement. The inner end of the shaft 75 is journaled in a gear housing 77 and is connected within the housing through a pair of intermeshing bevel gears 78 to a longitudinally extending power shaft 79, which is connected througth a pair of universal joints 80 to a shaft 81, which is journaled in a pair of longitudinally spaced bearings 82. The bearings 82 are fixed to a pair of transversely extending longitudinally spaced frame members 83, 84. The member 83 is fixed to the frame bars 52 at opposite ends, while the other transverse member 84 is fixed to a pair of forwardly extending supports 85 which are rigidly mounted on the rear ends of the tractor frame members 13, which project rearwardly beyond the tractor axle housing 16. A sprocket 86 is mounted on the forward end of the shaft 81 and is connected through a power chain 87 to a sprocket 88 mounted on the power take-off shaft 89 of the tractor.

A hand lever 95 is pivotally mounted by means of a transversely extending bolt 96 on the right hand side of the frame 51 and is connected to a rearwardly extending crank arm 97, which in turn is connected through a vertical link 98 to the leg or frame member 64 of the pick-up device. The lever 95 is secured in adjusted position by suitable latch mechanism of any conventional type (not shown) which engages a notched sector 99 fixed to the frame member 52. Thus, by means of the lever 95, the pick-up device 63 can be swung about the transverse axis of the shaft 62 to adjust the forward end of the pick-up device relative to the ground. The hand lever 95 is located conveniently to the operator's seat 100 so that it may be adjusted during operation in the field.

It will be noted that the pick-up device 63 extends transversely across the path of the tractor behind the latter, and is substantially coextensive with the cutter bar 82. By means of the pick-up fingers 69, the windrowed crop is picked up from the ground and carried upwardly and rearwardly and discharged over the rear end of the pick-up device, from which it is received by a conveyor indicated by reference numeral 105.

The conveyor 105 comprises a pair of laterally spaced longitudinally extending frame members 106, which are mounted on brackets 107 rigidly fixed to the rear ends of the frame members 52, The forward ends of the frame members 106 are journaled on a transverse shaft 108, which is rotatably supported in a pair of laterally spaced bracket plates 109. The bracket plates 109 are fixed to the lower ends of the legs 61 and extend rearwardly therefrom. The shaft 108 is extended laterally and is provided with a drive sprocket 110 over which the chain 71 is trained to transmit power thereto. A roller (not shown) is mounted on the shaft 108 between the side members 106 of the conveyor 105 and drives a conveyor belt 112, of the flexible endless type. At the rear end of the conveyor frame members 106 is journaled a shaft 113 on which is fixed a roller 114 over which the conveyor belt 112 is trained. A plurality of transversely disposed longitudinally spaced slats 115 are fixed to the conveyor belt 112 and are adapted to engage the crop that is discharged from the pick-up device 63 to the conveyor belt 112, for moving the crop to a point of discharge at the rear roller 114.

The conveyor 105 is inclined upwardly and rearwardly from a point beneath the discharge end of the pick-up device 63, directly rearwardly of the tractor and upwardly over the rear transverse frame member 58 to an elevated position above a trailing vehicle 116, such as a wagon or trailer carried on suitable supporting wheels 117 and drawn by means of a draft tongue 118 which is pivotally connected by means of a draft pin 119 to a connecting plate 120 mounted on the rear transverse frame member 58.

Thus, it will be evident that the harvester is entirely self-contained and self-propelled and the harvester and its trailing vehicle 116 all move in alignment in the path cut by the mower at the front of the implement.

The pick-up device 63 is preferably, although not necessarily, of the type shown and described in detail in Patent No. 2,253,797, granted August 26, 1941, to Melroe. The pick-up device is counterbalanced by means of a compression spring 121 which encircles a bolt 122 extending between the frame of the runner shoe 70 and the adjacent leg 61 of the channel-shaped frame member 60. Preferably, there are two counterbalancing springs 121, one at each end of the pick-up device 63, which are adapted to facilitate raising and lowering the forward end of the latter by means of a hand lever 95.

Figure 4:
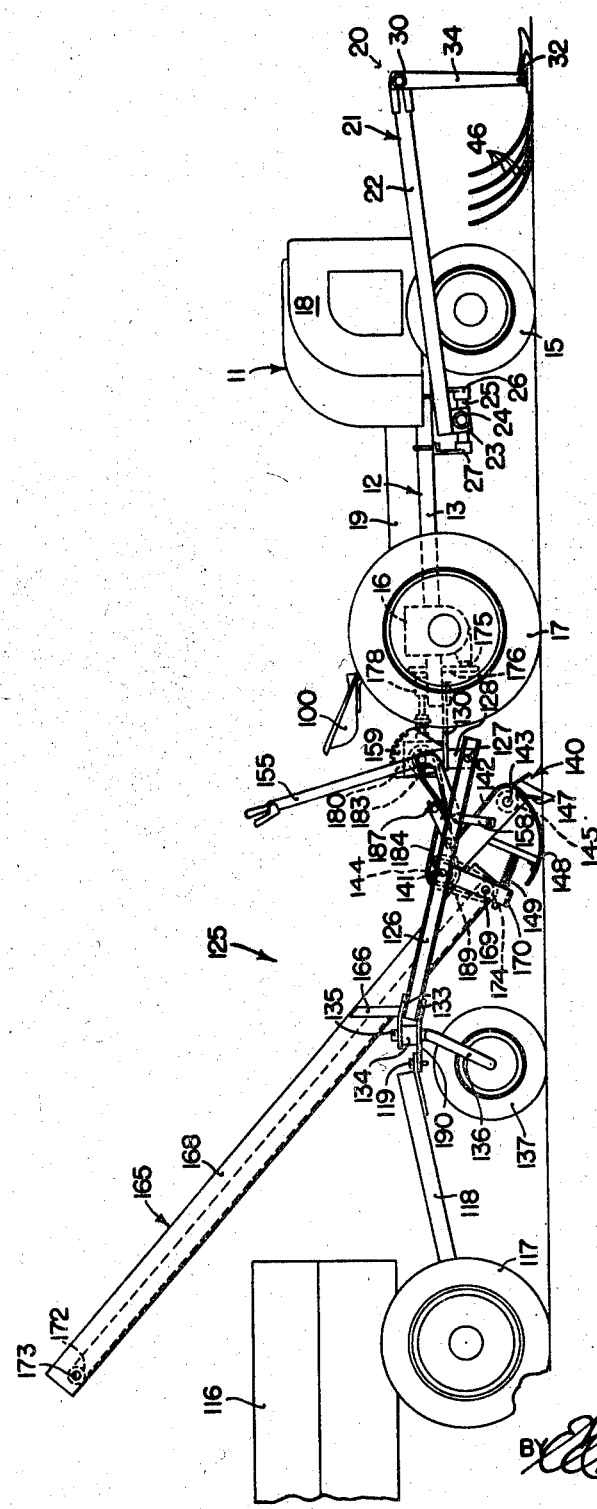
Figure 4 is a side elevational view of the embodiment shown in Figure 3.

Referring now more particularly to Figures 3 and 4, the mower 20 in this embodiment is identical with the mower in the embodiment of Figures 1 and 2 and therefore a description thereof need not be repeated. The same reference numerals are used in the parts of the mower in this embodiment. The details of the tractor 11 are also similar to those shown in the embodiment of Figures 1 and 2 and therefore similar reference numerals will be found on the corresponding parts of this embodiment.

In the embodiment of Figures 3 and 4, the pick-up and conveying device is indicated generally by reference numeral 125 and instead of being rigidly mounted on the tractor frame 12, the device is semi-mounted, that is, it is swingably mounted at its forward end on the tractor and is carried at its rear end by an independent ground support, as will be made clear in the following disclosure. The frame of the pick-up and conveying device, in other words, the crop loader, comprises a pair of laterally spaced longitudinally extending frame bars 126, pivotally connected at their forward ends by means of pivot bolts 127 aligned transversely, to a pair of depending bracket plates 128 at opposite ends of a transverse supporting member 129. The transverse member 129 extends across the rear of the tractor and is mounted on a pair of forwardly extending arms 130, which are in turn mounted at opposite ends, respectively, of a transverse beam 131 fixed to the rear ends of the tractor frame members 13. The rear ends of the crop loader frame members 126 converge rearwardly and incline slightly upwardly and are interconnected by a rear transverse frame member 132. A pair of upper and lower bracket plates 133 are fixed to the rear transverse member 132, in a substantially central position, and supported between the bracket plates 133 is a spindle bearing 134, within which is pivotally mounted the spindle 135 of a caster wheel fork 136. A caster wheel 137 is journaled between the arms of the form 136.

The pick-up device 140 is preferably of the belt type as in the previous embodiment, and comprises a transverse shaft 141 journaled in the two longitudinal frame members 126, and supporting a pair of forwardly and downwardly inclined frames 142, which carry a roller shaft 143 between their forward ends. A pair of rollers 144, 145 are mounted on the shafts 141, 143, respectively, and a plurality of endless flexible belts 146 are trained over the rollers 144, 145 to run in side-by-side relationship. The belts 146 are provided with rows of spring teeth or fingers 147 and are adapted to engage the ground to take the windrowed crop therefrom. A ground engaging shoe 148 is provided for preventing the spring fingers from digging into the ground, and a counterbalancing compression spring 149 is provided as described above. The pick-up device is raised and lowered by means of a hand lever 155, mounted on a rockshaft 156, which is journaled on top of the transverse beam 129, the rockshaft being provided with a rearwardly extending crank arm 157, which is connected to one end of a link 158, the other end of which is connected to the side member 142. The hand lever 155 is secured in adjusted position by means of a notched sector 159 mounted on the transverse beam 129.

As in the embodiment of Figures 1 and 2, the pick-up device 140 is substantially coextensive with the cutter bar 32 and picks up the windrowed crop and discharges it rearwardly upon the lower end of an upwardly and rearwardly inclined conveyor 165. The conveyor 165 is rigidly mounted on a bracket 166 on the rear transverse frame member 132 of the caster wheel mounted frame. The conveyor 165 is somewhat narrower than the pick-up device 140, but a pair of laterally inclined chutes 167 convey the harvested crop from the ends of the pick-up device 140 to the conveyor. The side frame members 168 of the conveyor are rigidly mounted on the brackets 166 and are also journaled at their forward and lower ends on a transverse shaft 169, the latter being journaled in a pair of downwardly extending legs 170 fixed to the frame members 126. The flexible endless conveyor belt 171 is trained over a roller 174 mounted on the shaft 169 and also over a roller 172 mounted on a transverse shaft 173 at the upper end of the conveyor frame 168.

Power is supplied to the crop loader 125 from the tractor power take-off shaft 175 through a chain drive 176 to a shaft 177 journaled in a bearing 178 mounted on the transverse member 131. The shaft 177 is coupled to a pair of intermeshing beveled gears 179 within a gear housing 180 mounted on the transverse supporting member 128. A transverse power shaft 181 is journaled in the gear housing 180 and receives power from the bevel gears 179. The outer end of the shaft 181 is journaled in a bearing 182 at the outer end of the frame member 129 and a sprocket 183 is fixed to the outer end of the shaft 181. A drive chain 184 interconnects the sprocket 183 with a driven sprocket 185 connected through a slip clutch 186 to the upper roller shaft 141 of the pick-up device 140. A spring biased belt tightening idler 187 is mounted on an arm 188, which is swingably mounted on the frame member 125 and takes up the slack in the chain 184 as the frame members 126 swing vertically about the transverse axis of the pivot members 127. Another drive chain 189 connects a pair of sprockets on the shaft 141 and the shaft 169 to drive the conveyor belt 171.

In this embodiment of our invention, it will be noted that part of the weight of the crop loader 125 is carried on the caster wheel 137, and only a portion of the weight is carried on the rear end of the tractor through the pivot members 127. In this embodiment as well as in the foregoing embodiment, the frame of the loader is laterally rigid with respect to the tractor frame and therefore swings with the tractor as the latter turns a corner. During operation, the pick-up device gathers the windrow and deposits it upon the conveyor belt 171, which moves the crop upwardly and rearwardly and discharges it over the upper conveyor roller 172 into the wagon or trailer 116. The latter is connected through the draft member 118 which is pivotally connected by the pivot pin 119 to a rearward extension 190 of the lower caster wheel bracket plate 133.

Figure 5:
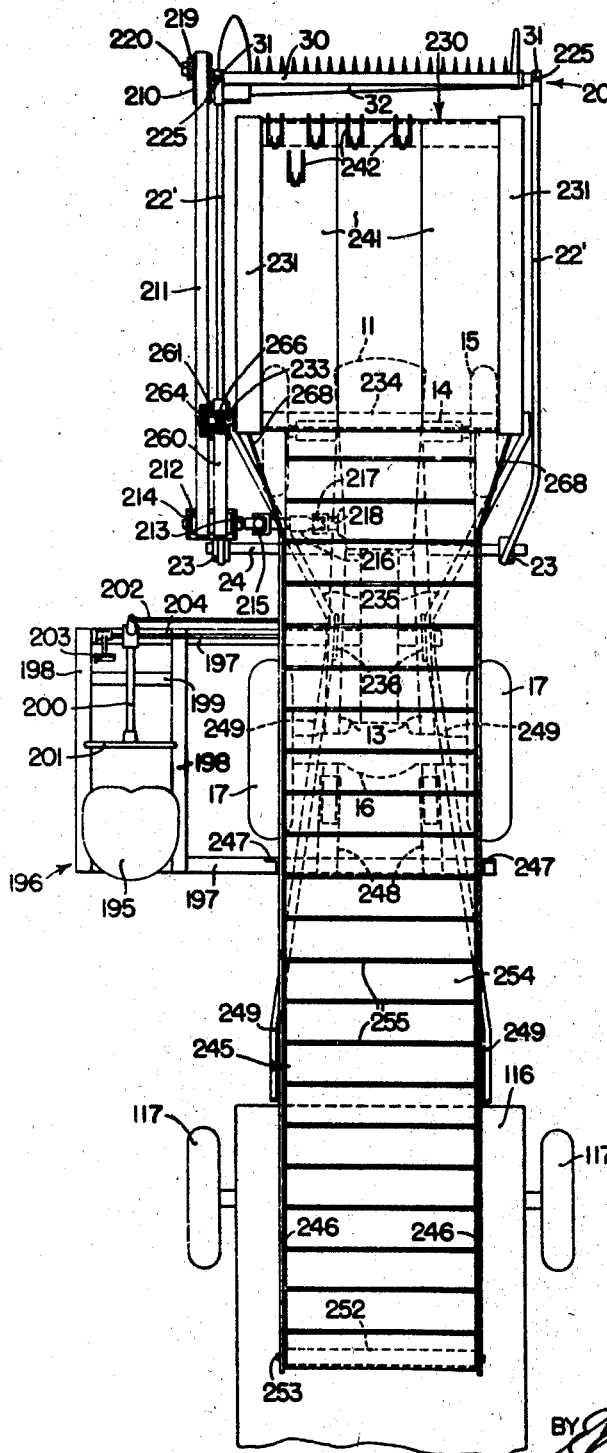
Figure 5 is a plan view showing another modification of the present invention.

Referring now more particularly to Figures 5 and 6, the tractor 11 is identical with the tractors in the two embodiments described hereinbefore, with the exception that the operator's seat 195 is supported on a framework 196 mounted in offset position at one side of the tractor. The framework 196 comprises a pair of fore and aft spaced transversely disposed structural channel members 197 fixed beneath the tractor frame members 13 and extending laterally from the left side of the tractor. The outer ends of the members 197 are interconnected by a pair of fore and aft extending laterally spaced beams 198, on which the seat 195 is mounted and between which members a foot rest bar 199 is supported. A steering column 200 is provided in front of the operator's seat 195 and a suitable steering wheel 201 is connected through linkage 202, extending alongside the front transverse member 197, for operating the steering mechanism of the tractor. A clutch pedal 203 is mounted on a rockshaft 204 which extends laterally inwardly along the beam 197 and is connected by suitable linkage (not shown) with the clutch disconnecting mechanism of the tractor.

In this embodiment, the mower cutter bar 32 is mounted ahead of the tractor as before, but the push bars 22' are appreciably longer than the push bars 22 in the other two embodiments, thereby placing the mower cutter bar at a greater distance ahead of the tractor.

The mower sickle is driven through a flywheel 210 journaled on the end of the rockshaft 30 and receives power through a power transmitting belt 211 which is trained over a drive pulley 212 mounted on a shaft 213, the latter being journaled in a bracket 214 rigidly mounted on the left hand push bar 22' near the rear end thereof. The shaft 213 is connected through a universal joint 215 to a telescoping shaft 216, which is connected through another universal joint 217 to the belt pulley shaft 218 of the tractor. The flywheel 210 is provided with a crank 219 on which the pitman 220 is journaled. A more complete description of this mower is given in the patent mentioned hereinabove.

In this embodiment, however, the rockshaft 30 is secured rigidly to the push bars 22' by bolts 225 to prevent the cutter bar from swinging upwardly and rearwardly as in the other embodiment. This eliminates the necessity for the latch mechanism 35 but makes it necessary for the operator to avoid striking any large obstruction such as rocks or stumps during the operation in the field. The swing-back feature is eliminated from this mower because of the pick-up device 230, which is located immediately behind the mower cutter bar.

The pick-up device 230 comprises a pair of side frame members 231 supported on curved shoes or skids 232 at their forward ends and inclined upwardly and rearwardly therefrom, the upper ends of the frame members 231 being swingably mounted on a transverse shaft 233 disposed above the tractor engine 18 and journaled on a superstructure including vertical frame members 234 extending upwardly and diverging outwardly from the sides of the tractor frame 12. Bracing members 235 are inclined downwardly and rearwardly and converge inwardly from the upper portions of the supporting members 234 and are fixed at their lower ends to a pair of supporting plates or brackets 236 rigidly fixed to the tractor frame members 13, respectively. The forward ends of the conveyor side members 231 are interconnected by a transverse frame member 237 connected between the runners 232 at opposite sides of the pick-up device. A shaft 238 is disposed transversely at the forward end of the pick-up device and is journaled at opposite ends thereof, respectively, in the two side members 231. A roller 239 is mounted on the shaft 238 at the forward end of the pick-up device and the second roller 240 is mounted at the rear end of the pick-up device on the shaft 233. A plurality of flexible endless belts 241 are trained over the two rollers 239, 240 in side-by-side relation and are provided with spring pick-up fingers 242 which pick the crop off the ground and convey it upwardly and rearwardly over the pick-up device 230, discharging the crop from the rear end of the pick-up device onto a belt type conveyor, indicated by reference numeral 245.

The conveyor 245 comprises a pair of laterally spaced longitudinally extending frame members 246 supported at their forward ends on the supporting members 234 at the front of the tractor. A second pair of vertical frame members 247 are supported on the transverse frame member 197, which is fixed to a pair of rearwardly extending members 248 serving as extensions of the tractor frame members 13. A pair of inclined braces 249 are fixed at their forward ends to the bracket plates 236 and extend upwardly and rearwardly and diverge outwardly and are secured at their rear ends to the side members 246. The intermediate portions of the bracing members 249 are connected to the supports 247 for bracing the latter. At the forward end of the conveyor 245, a shaft 250 is disposed transversely between and journaled at opposite ends, respectively, in the supports 234. The shaft 250 carries the front nveyor roller 251, and the rear conveyor roller 2 is fixed to a shaft 253 at the rear end of the nveyor and journaled in the side frame members 246. A conveyor belt 254 is trained over the o rollers 251, 252 and is provided with transrse slats 255 for engaging the crop discharged on the belt by the pick-up belt 241.

The pick-up belt 241 and the conveyor belt 254 e driven from the pulley 212 by means of a belt 0, which is trained over a pulley 261 mounted a shaft 262, which is journaled in the frame embers 234 beneath the shaft 250. The shaft 2 is also provided with a sprocket 263 rigidly ed thereto, which drives a sprocket 264 on the ck-up drive shaft 233, through a drive chain 5. Another drive chain 266 connects a pair of rockets on the shafts 233 and 250, for driving the nveyor belt 254.

Thus it is evident that in this embodiment of ır invention, the pick-up device 230 is directly ehind and coextensive with the cutter bar 32, nd the cutter bar 32 is swingable with the push ars 22' about the axis of the transverse shaft 24, hile the pick-up device 230 is swingable about e transverse axis of its supporting shaft 233. asmuch as the pick-up device is slightly wider an the conveyor belt 254, the crop material discharged from the pick-up device 230 is guided the belt 254 by means of a pair of sheet metal uiding walls 268. As in the other embodiments, e conveyor belt 254 discharges the crop into e trailer or wagon 116, which follows the tractor nd is drawn by means of the draft tongue 118, hich is pivotally connected by means of the raft pin 119 to the drawbar 270 of the tractor.

We claim:

1. A crop loader attachment for a tractor comrising in combination a frame comprising a pair f laterally spaced, longitudinally extending frame ars, means for pivotally mounting the forward nd of said frame on the rear end of a tractor for ertical swinging movement about a transverse xis, ground engaging supporting means for the ear end of said frame, a transverse shaft carried y said bars by means providing for rotation of aid shaft, a pick-up device swingably mounted n said shaft and inclined downwardly and forvardly therefrom and including a rotary member mounted on said shaft to rotate therewith, a conrol lever swingably supported on said frame and onnected to said pick-up device for adjusting he height thereof, and power transmitting means onnected to said shaft for rotating the latter by ower from the tractor engine.

2. A crop loader attachment for a tractor comrising in combination, a frame comprising a air of laterally spaced, longitudinally extending rame bars, means for pivotally mounting the forvard end of said frame on the rear end of a tracor for vertical swinging movement about a transerse axis, ground engaging supporting means for he rear end of said frame, a transverse shaft arried by said bars by means providing for rotaion of said shaft, a pick-up device swingably mounted on said shaft and inclined downwardly and forwardly therefrom and including a rotary member mounted on said shaft to rotate therewith, a control lever swingably supported on said frame and connected to said pick-up device for adjusting the height thereof, power transmitting means connected to said shaft for rotating the latter by power from the tractor engine, a conveyor rigidly supported between said bars and extending from a position beneath the discharge end of said pick-up device upwardly and rearwardly and adapted to discharge into a vehicle behind the tractor, and draft means connected to the rear ends of said frame bars for towing the vehicle.

3. For use with a tractor having a longitudinal body supported on front wheels and on a wheeled, transverse rear axle structure and including a rearwardly located operator's station and a rearwardly disposed power take-off shaft: a crop pick-up and loaded attachment comprising a frame adapted for longitudinal disposition behind the tractor and including a pair of generally longitudinal bars having forward end portions spaced transversely apart to straddle the operator's station and to extend to a portion of the tractor body ahead of the rear axle structure, said bars extending rearwardly past the rear axle structure and projecting at the rear of the tractor to provide a rear end portion of the frame; first means on the forward end portions of the bars providing for connection thereof to the tractor body ahead of the tractor rear axle structure; second means on the bars rearwardly of the first means for supporting the bars on the tractor rear axle structure; a crop pick-up device disposed below the frame and rearwardly of the second means and including a drivable part; means connecting the pick-up device to the frame, including provision for vertical adjustment of said device relative to the frame; drive means carried on the frame and including a first drive element connected to the drivable part of the device, and a second drive element extending forwardly and having provision for releasable connection to the tractor power take-off shaft; means for adjusting the pick-up device vertically, including a control member movably carried by one of the bars at a portion thereof adjacent to the aforesaid second means so as to be convenient to the operator's station, and a control connection between said member and said device; and a crop loader carried by the frame and inclining upwardly and rearwardly from a receiving end behind and proximate to the pick-up device to a discharge end behind and at a level above the rear end portion of the frame.

4. The invention defined in claim 3, further characterized in that: the rear end portion of the frame includes means for hitching thereto a trailing vehicle to receive crops discharged by the crop loader.

5. For use with a tractor having a longitudinal body supported on front wheels and on a wheeled, transverse rear axle structure and including a rearwardly located operator's station and a rearwardly disposed power take-off shaft: a crop pick-up and loader attachment comprising a frame adapted for longitudinal disposition behind the tractor and including a pair of generally longitudinal bars having forward end portions spaced transversely apart to straddle the operator's station and to extend to a portion of the tractor body ahead of the rear axle structure, said bars extending rearwardly past the rear axle structure and projecting at the rear of the tractor to provide a rear end portion of the frame; first means on the forward end portions of the bars providing for connection thereof to the tractor body ahead of the tractor rear axle structure; second means on the bars rearwardly of the first means for supporting the bars on the tractor rear axle structure; a crop pick-up device disposed below the frame and rearwardly of the second means and including a drivable part; means connecting the pick-up device to the frame; drive means carried on the frame and including a first drive element connected to the drivable part of the device, and a second drive element extending forwardly and having provision for releasable connection to the tractor power take-off shaft; and a crop loader carried by the frame and inclining upwardly and rearwardly from a receiving end behind and proximate to the pick-up device to a discharge end behind and at a level above the rear end portion of the frame.

6. The invention defined in claim 5, further characterized in that: the means for supporting the pick-up device provides in addition a support for the receiving end of the loader; the loader includes a drivable part; and said drive means includes provision for driving the drivable part of the loader.

7. For use with a tractor having a longitudinal body supported on front wheels and on a wheeled, transverse rear axle structure and including a rearwardly located operator's station and a rearwardly disposed power take-off shaft: a crop pick-up and loader attachment comprising a frame adapted for longitudinal disposition behind the tractor and including a pair of generally longitudinal bars having forward portions spaced transversely apart and provided with connecting means for connection thereof to laterally spaced portions of the tractor body in proximity to the tractor operator's station, said bars projecting rearwardly from said forward portions and having interconnected rear end portions establishing a rear supporting part on the frame; a pick-up device disposed below and rearwardly of the forward portions of the bars and forwardly of the rear supporting part of the frame, and having a drivable part; means supporting the pick-up device on the frame, including provision for vertical adjustment of the device relative to the frame; means for adjusting said device vertically, including a control member movably carried by the forward portion of one bar so as to be convenient to the tractor operator's station, and a control connection between said member and said device; a crop loader inclining upwardly from a receiving end below the frame and adjacent to the pick-up device to a discharge end rearwardly of and at a level above the rear supporting part of the frame, said loader having a drivable part; means supporting the crop leader on the frame at the forward portions of the bars; means supporting the crop loader also on the rear supporting part of the frame so that the loader is a part of the frame and is independent of the tractor; and drive means on the frame including driving connections to the drivable part of the loader and the drivable part of the pick-up device, and further including a forwardly extending drive element having provision for releasable connection to the tractor power take-off shaft.

8. For use with a tractor having a longitudinal body supported on front wheels and on a wheeled, transverse rear axle structure and including a rearwardly located operator's station and a rearwardly disposed power take-off shaft: a crop pick-up and loader attachment comprising a frame adapted for longitudinal disposition behind the tractor and including a pair of generally longitudinal bars having forward portions spaced transversely apart and provided with pivotal connecting means for connection of the frame to a rear part of the tractor body on a transverse pivot axis, said bars projecting rearwardly from said forward portions and adapted to swing vertically about said pivot axis and further having interconnected rear end portions establishing a rear supporting part on the frame; ground-engaging means connected to said rear supporting part for sustaining said part of the frame; a pick-up device disposed below and rearwardly of the forward portions of the bars and forwardly of the rear supporting part of the frame, and having a drivable part; means supporting the pick-up device on the frame, including provision for vertical adjustment of the device relative to the frame; means for adjusting said device vertically, including a control member movably carried by a forward portion of the frame so as to be independent of the tractor yet convenient to the operator's station, and a control connection between said member and said device; a crop loader inclining upwardly from a receiving end below the frame and adjacent to the pick-up device to a discharge end rearwardly of and at a level above the rear supporting part of the frame, said loader having a drivable part; means supporting the crop loader on the frame at the forward portions of the bars; means supporting the crop loader also on the rear supporting part of the frame so that the loader is a part of the frame and is independent of the tractor; and drive means on the frame including driving connections to the drivable part of the loader and the drivable part of the pick-up device, and further including a forwardly extending drive element having provision for releasable connection to the tractor power take-off shaft.

ALVIN W. OEHLER.
NOLAN D. COLVIN.
LOUIS A. PARADISE.

REFERENCES CITED

The following references are of record in the file of this patent:

UNITED STATES PATENTS

| Number | Name | Date |
| --- | --- | --- |
| 874,532 | Ohm | Dec. 24, 1907 |
| 972,910 | Pipper | Oct. 18, 1910 |
| 1,212,061 | Howard | Jan. 9, 1917 |
| 1,213,284 | Slather | Jan. 23, 1917 |
| 1,273,312 | Baum | July 23, 1918 |
| 1,375,565 | Chamberlin | Apr. 19, 1921 |
| 2,199,257 | Ferrin | Apr. 30, 1940 |
| 2,325,833 | Cook | Aug. 3, 1943 |
| 2,347,907 | Hill | May 2, 1944 |
| 2,349,386 | Stoetzl et al. | May 23, 1944 |